United States Patent [19]

Rigoulot

[11] Patent Number: 4,715,751
[45] Date of Patent: Dec. 29, 1987

[54] DEVICE FOR THE INTERNAL MACHINING OF A TUBE

[75] Inventor: Claude Rigoulot, 71100 Chalon Sur Saone, France

[73] Assignee: Commissariat a l'Energie Atomique, Paris, France

[21] Appl. No.: 909,466

[22] Filed: Sep. 19, 1986

[30] Foreign Application Priority Data

Sep. 27, 1985 [FR] France ................. 85 14351

[51] Int. Cl.⁴ .............................. B23C 3/02
[52] U.S. Cl. .................... 409/139; 82/1.5; 409/143
[58] Field of Search ............... 82/1.2, 1.4, 1.5; 408/75, 76, 81, 124, 127, 147; 409/139, 143, 200; 51/245

[56] References Cited

U.S. PATENT DOCUMENTS

| 1,912,419 | 6/1933 | Whitman . | |
|---|---|---|---|
| 2,441,158 | 5/1948 | Krasnow | 408/149 |
| 3,070,053 | 12/1962 | Woolley . | |
| 3,844,007 | 10/1974 | Kojima | 29/33 A |
| 4,327,526 | 5/1982 | Pettyjohn et al. | 409/139 |

FOREIGN PATENT DOCUMENTS

| 924984 | 3/1955 | Fed. Rep. of Germany . | |
|---|---|---|---|
| 2187481 | 1/1974 | France . | |
| 17590 | 2/1979 | Japan | 408/75 |
| 837747 | 6/1981 | U.S.S.R. | 408/124 |
| 1168386 | 7/1985 | U.S.S.R. | 408/124 |

Primary Examiner—Z. R. Bilinsky
Attorney, Agent, or Firm—James E. Nilles; Thomas F. Kirby

[57] ABSTRACT

Device for the internal machining of a tube comprising a mobile assembly which can be located in the tube and having a first part with at least two centering bearings and two rotors, and a second part linked in radially sliding manner with the first part and having a machining tool able to machine the interior of the tube, one of the said rotors driving the machining tool via a transmission shaft and the other of the said rotors rotating said second part; as well as a fixed assembly arranged around the tube and having first and second magnetic devices, each establishing a rotary magnetic field able to rotate the two rotors and a third magnetic device establishing a rotary magnetic field able to displace the said second part radially with respect to the first part, while rotating in phase with the second part.

11 Claims, 4 Drawing Figures

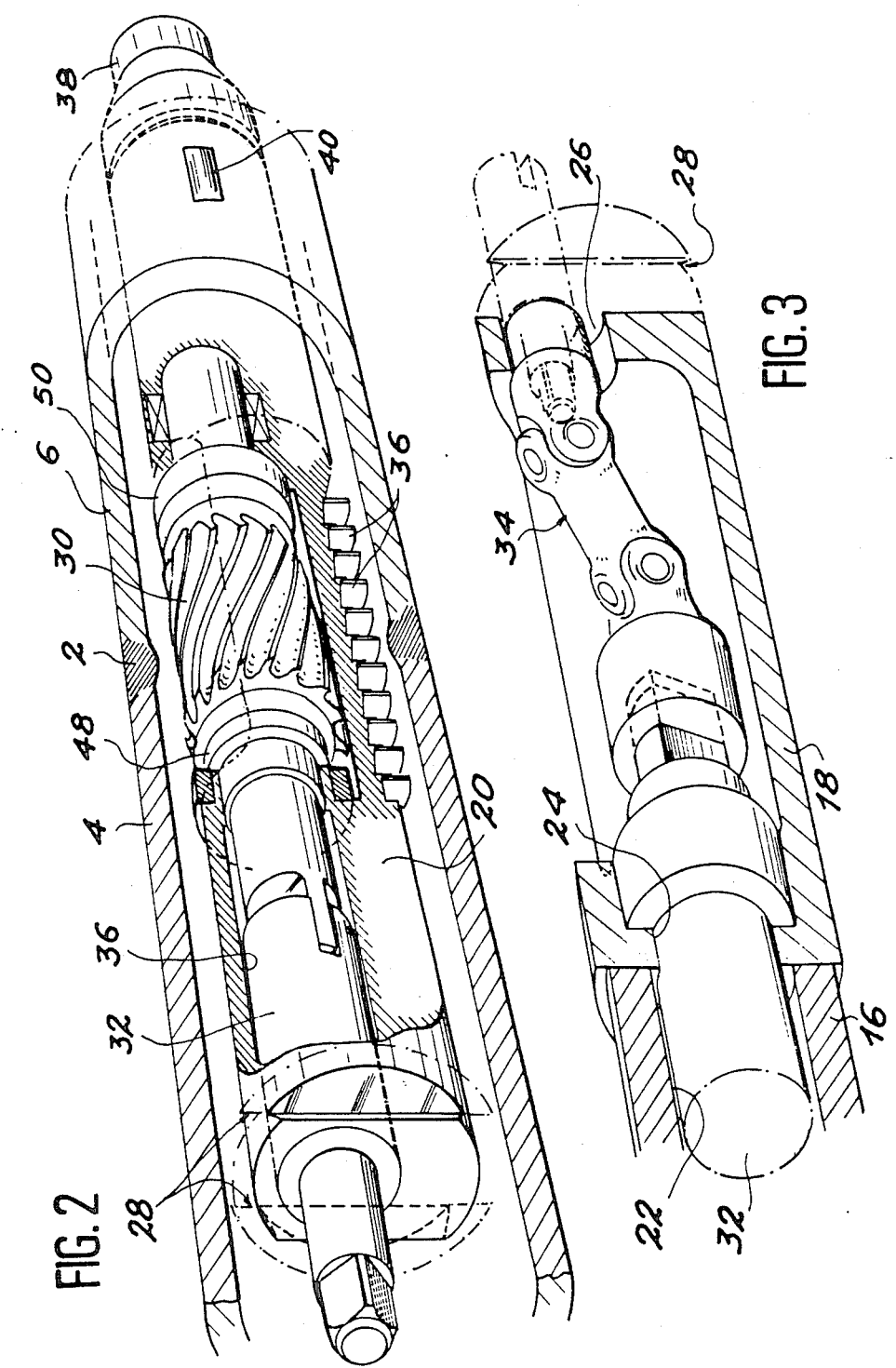

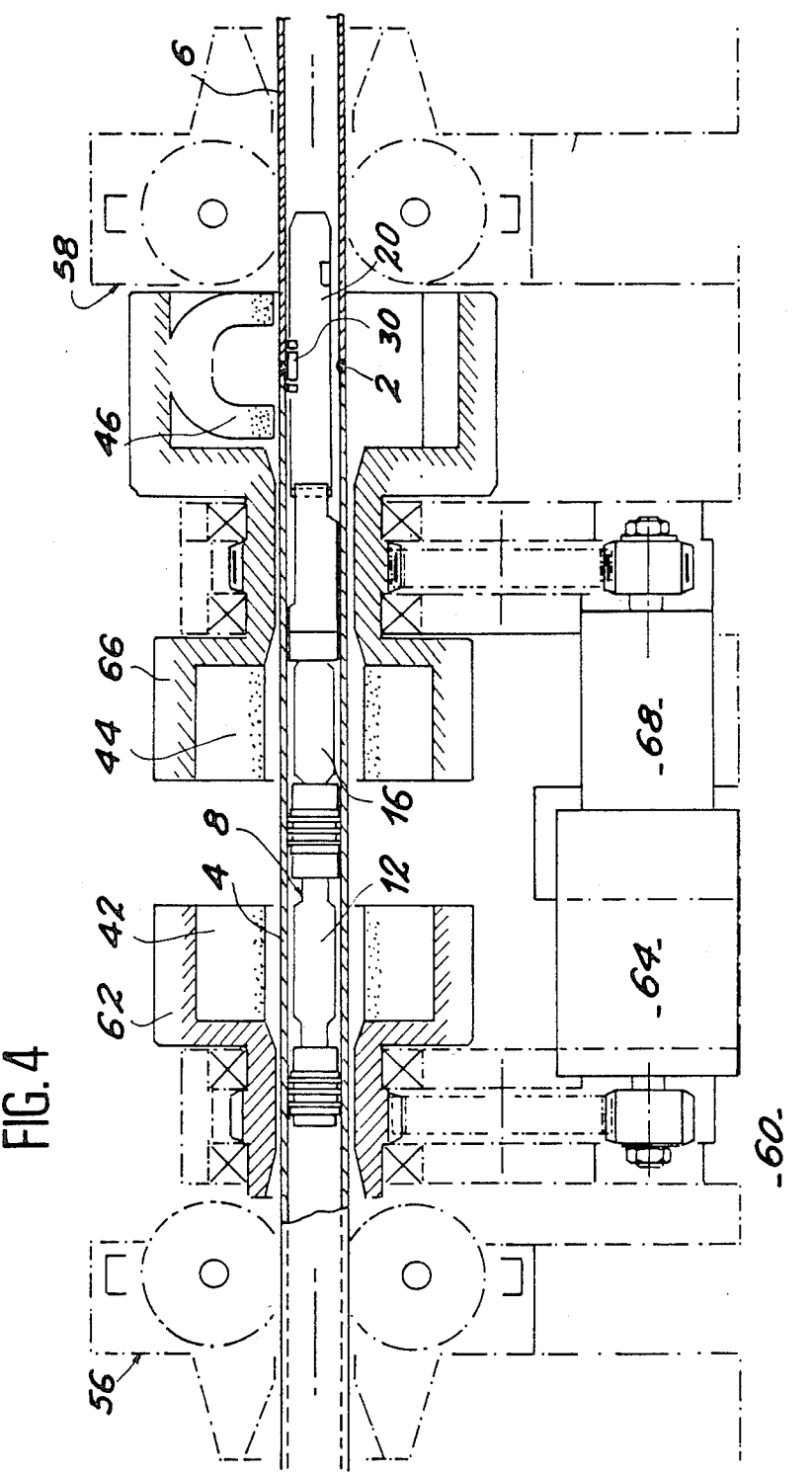

DEVICE FOR THE INTERNAL MACHINING OF A TUBE

BACKGROUND OF THE INVENTION

The present invention relates to a device for the internal machining of a tube. It particularly applies to the machining of the inner bead of a weld between two long tubes.

For certain applications, such as heat exchangers, is it sometimes necessary to have very long tubes, which are normally formed by the butt welding of several smaller tubes. For example for coils, these tubes are subject to pressures of several hundred bars and to temperatures of several hundred degrees celsius.

The present welding processes (TIG, electron beam, etc) have difficulty in preventing the formation of a welding bead within the tube at the point where the two welded tubes are joined.

However, in view of the aforementioned operating conditions, such an internal bead leads to stress concentration at such junction, which is prejudicial to the satisfactory fatigue behaviour of the tube. Moreover, during the inspection of welds by means of probes, the internal bead can prevent the introduction of such probes, or lead to the wear thereof by friction, or can distrub the continuous advance of the supply cables for such probes by inducing spurious signals in them. It is for this reason that it is very advantageous to machine the internal bead of the weld between two tubes.

Hitherto, two known methods are conventionally used for machining said bead.

A first method consists of mounting a tool at the end of an extension piece which is rotated during machining. This method has the major disadvantage of being unusable in the case of very long tubes, the extension piece being unable to withstand the effective twisting torque during machining. The extension piece which is subject to twisting can then be the location of torsion vibrations which are incompatible with correct machining.

A second method consists of forcing scrapers through the tube in one pass or giving them a reciprocating movement, the pass or passes ensuring the machining of the bead. The major disadvantage of this method is that the scrapers scratch the interior of the tube during their displacements. The thus-produced scratches can give rise to disturbing stress concentrations and in particular can assist the corrosion of the tube interior.

SUMMARY OF THE INVENTION

The present invention aims at obviating the aforementioned disadvantages and relates to a device for the internal machining of a tube, particularly a long tube, said machining being carried out by a tool, whose rotation, advance and axial positioning are ensured by magnetic means.

Another object of the invention consists of providing a device making it possible to carry out a series, high quality machining of the interior of the tube (shape, surface state, etc).

The present invention therefore relates to a device for the internal machining of a tube, wherein it comprises a mobile assembly which can be positioned in the tube and has a first part with at least two bearings able to ensure the centering of the mobile assembly in the tube and provided with two rotors which freely rotate along a longitudinal axis of said mobile assembly, and a second part linked in radial sliding relationship with the first part and having a machining tool mounted so as to rotate freely along a longitudinal axis so that it can machine the interior of the tube, one of the said rotors driving the machining tool via a transmission shaft and the other of the said rotors rotating the second part and a fixed assembly arranged around the tube and comprising first and second magnetic devices, each centered respectively substantially about the median transverse plane of each rotor and each establishing a rotary magnetic field able to rotate said two rotors and a third magnetic device centered substantially about the median transverse plane of the cutting tool and establishing a rotary magnetic field able to displace the second part radially with respect to the first part, whilst rotating in phase with the second part.

Advantageously, at least one of the three magnetic devices has permanent magnets rotated about the tube or comprises a multipole electromagnetic stator arranged around the tube.

Advantageously, two magnets are located in the vicinity of the free end of the second part and two magnetic detectors are positioned around the tube in such a way that one of the detectors defines the longitudinal position of the mobile assembly in the tube by detecting one of the magnets and the other detector detects the angular position of the second part by detecting the other magnet.

Advantageously, two cylindrical abutments are located on either side of the cutting tool and have a diameter which is equal to or less than that of said tool.

BRIEF DESCRIPTION OF THE DRAWINGS

The invention is described in greater detail hereinafter relative to non-limitative embodiments and the attached drawings, which show:

FIG. 2, a perspective view of the second part of the mobile assembly.

FIG. 3, a perspective view of the intermediate part of the mobile assembly.

FIG. 4, A diagrammatic longitudinal sectional view of the device according to the invention and the means used for actuating it.

DETAILED DESCRIPTION OF THE PREFERRED EMBODIMENTS

Figure 1:
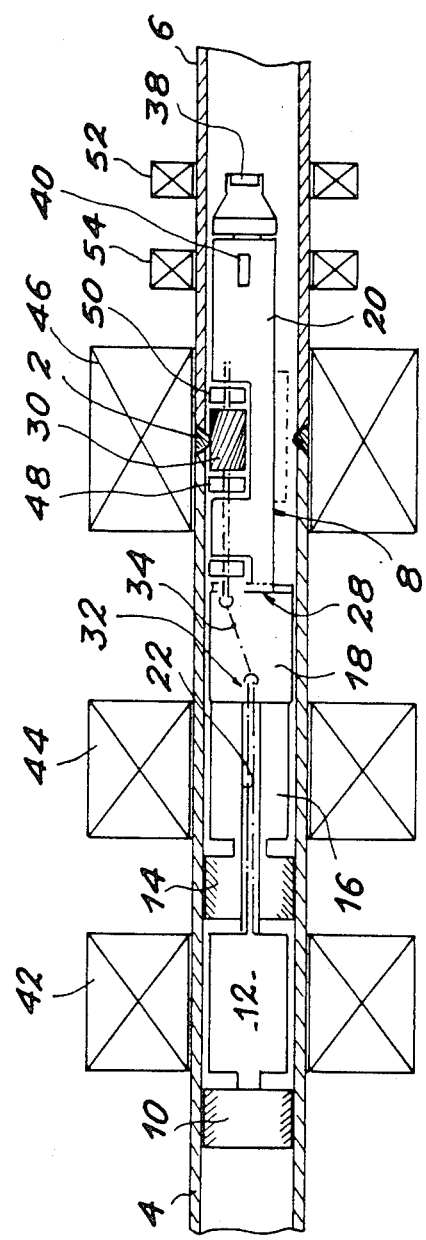
FIG. 1, a diagrammatic longitudinal sectional view of the device according to the invention.

The device according to the invention is shown in simplified form in FIG. 1. The function of this device is to machine the welding bead 2 between two butt welded tubes 4, 6.

The device firstly comprises a mobile assembly 8 which is introduced into tubes 4, 6. This mobile assembly 8 successively has from left to right in FIG. 1, a first bearing 10, a first rotor 12, a second bearing 14, a second rotor 16, an intermediate part 18 and a tool holder 20.

The first and second bearings 10, 14 serve as a centering support for the mobile assembly 8 in tube 4. For this purpose, they are cylindrical and advantageously have an elastic lining or packing on their outer surface, enabling them to slide in tube 4 without scratching it and whilst ensuring their centering function.

The first rotor 12 is supported by two bearings 10, 14 and rotates freely, but is longitudinally fixed with respect thereto. In the same way, the second rotor 16 is supported in freely rotating manner by the second bearing 14, but is longitudinally fixed with respect thereto. These two rotors 12, 16 are cylindrical and have a slightly smaller external diameter than that of the bearings, permitting a free rotation thereof in tube 4. A bore 22 is formed in the second bearing 14 and the second rotor 16, along the longitudinal axis of the mobile assembly.

The intermediate part 18 is fixed to the second rotor 16, so as to be rotated by the latter. With reference to FIG. 3, said intermediate part 18 is cylindrical, hollow and provided with two orifices 24, 26 at its end. The left-hand orifice 24 is cylindrical and coaxial to bore 22 of second rotor 16 and the right-hand orifice 26 is in the form of a radially oriented oblong hole.

Tool holder 20 is supported by intermediate part 18, e.g. by means of a mortise and tenon joint 28 (shown in mixed line form in FIGS. 2 and 3). Thus, tool holder 20 is rotated by said intermediate part 18, but is free in radial translation with respect thereto. Tool holder 20 has a substantially cylindrical shape, but its diameter is sufficiently small to permit its radial translation and rotation in tube 4.

A space is formed in the central part of member 20, in such a way that a tool, such as a cutter 30 can be housed therein (FIG. 2). Said cutter 30 is supported in longitudinal rotation about an axis parallel to the axis of rotors 12, 16 by bearings located in holder 20, in such a way that the teeth of the cutter pass beyond the outer surface of holder 20, thus permitting an internal machining of bead 2.

Cutter 30 is rotated by the first rotor 12 via a transmission shaft 32. The later, which is fixed to the first rotor 12, passes through the second bearing 14 and the second rotor 16 by their bore 22. Shaft 32 then issues into the intermediate part 18 via orifice 24 and is then displaced for the longitudinal axis of the mobile assembly by a cardan joint 34. Shaft 32 passes through oblong hole 26 and is then guided in rotation by a bore 36 in the tool holder 20 and is finally fixed to cutter 30.

Thus, cutter 30 is constantly rotated by the first rotor 12, no matter what the radial position of tool holder 20 with respect to intermediate part 18 and this takes place by means of the cardan joint 34 and the oblong hole 26, which permit a certain deflection or displacement of shaft 32.

Ribs or fins 36 arranged on the tool holder 20 substantially opposite to cutter 30 permit the discharge of cutting chips to the right in FIG. 2.

A magnet 38 is placed on the end face of the free end of tool holder 20. Another magnet 40 is fixed to the outer surface of said tool holder 20 in the vicinity of its free end.

On once again referring to FIG. 1, a fixed assembly is disposed around tubes 4, 6. This assembly has a first magnetic device 42 and a second magnetic device 44, each positioned substantially about median transverse planes with respect to the first and second rotors 12, 16 respectively. A third magnetic device 46 is positioned substantially around the median transverse plane of cutter 30.

Each of the first and second magnetic devices 42, 44 respectively is able to establish a rotary magentic field permitting the rotation of the two respective rotors 12, 16. These devices are e.g. multipole electromagnetic stators arranged around the tube and have one or more permanent magnets rotated about the tube by an auxiliary means.

The third magnetic device 46 can be a multipole stator, but is appropriately a permanent magnet rotated by an auxiliary means, said magnet attracting towards it tool holder 20 and thus making it possible to apply cutter 30 to bead 2 with a certain force.

To ensure that the cutter does not machine the bead too deeply, two cylindrical abutments 48, 50 are arranged coaxially on either side of cutter 30 (FIGS. 1 and 2) and have a diameter equal to or less than or more than when it is wished to retain part of the bead, that of the cutter 30, the difference in the radii of abutments 48, 50 and cutter 30 corresponding to the desired machining pass depth in the tube.

Two magnetic detectors 52, 54 are disposed around tube 6, in such a way that one 52 of the detectors marks the longitudinal position of the mobile assembly in the tube by detecting magnet 38 and the other detector 54 marks the angular position of tool holder 20 by detecting magnet 40.

Such a machining installation comprising the device according to the invention is shown in FIG. 4. The two welded tubes 4, 6 are positioned by two guides 56, 58 located at a certain distance from one another and supported by a frame 60. Each of the guides 56, 58 has two facing rollers, whose groove adopts the shape of the tube and which are applied with a certain force to the tubes. Not shown driving means for the said rollers make it possible to advance tubes 4 and 6 to a given position. The fixed assembly is placed between these two guides 56, 58 and permits the actuation of the mobile assembly located in tubes 4, 6.

The first magnetic device 42, a permanent magnet in the present case, is located in a cylindrical part 62 freely supported in rotation along a longitudinal axis on frame 60. A motor 64 rottes part 62 and therefore magnet 42 via a gear train.

The second and third magnetic devices 44, 46, in this case permanent magnets, are located in a cylindrical support 66 mounted so as to rotate freely along a longitudinal axis on frame 60. A motor 68 rotates support 66 and therefore magnets 44, 46 via a gear train.

Frame 60, part 62 and support 66 are arranged in such a way that magnets 42, 44, 46 are positioned longitudinally in a position enabling them to respectively actuate rotors 12, 16 and tool holder 20. Magnet 38 and detector 52 cooperate in order to mark or designate this position.

The operation of the machining installation will now be described. The welded tubes 4, 6 are firstly translated by two guides 56, 58 until the welding bead 2 is in a given machining position. The mobile assembly is then introduced into tube 4, 6 until detector 52 detect magnet 38.

Motor 64 is then actuated, leading to the rotation of magnet 42, which magnetically drives rotor 12. Thus, cutter 30 is rotated. Motor 68 is then actuated, rotating magnets 44, which magnetically drive rotor 16 and rotate tool holder 20. Simultaneously, holder 20 is magnetically attracted by magnet 46, which rotates in phase with magnet 44 and therefore with holder 20. Cutter 30, applied with a certain force against bead 2, machines the later, the advance being determined by the rotation of tool holder 20 until two abutments 48, 50 are in contact with the interior of tube 4. It is then no longer possible for the cutter to operate. During this time, the cutting chips are discharged to the right by fins 36. Magnet 40 and detector 54 cooperate to mark the angular position of tool holder 20. Thus, it is possible to count the number of machining rotations performed and to stop motors 64, 68 when the bead machining is ended.

This is followed by the removal of the mobile assembly and then tubes 4, 6 are advanced in order to recommence the same operation on another joint or onto other tubes.

Obviously the above description has only been given in an exemplified manner and constructional variants are possible without modifying the basic principle of the invention.

Thus, e.g. a second tool can be added in series, whereby this can be a cutter, a grinding wheel, etc. A channel within the mobile assembly could supply a cutting liquid or pressurized air for removing chips. The tube centering means can be of different types, e.g. roller bearings, plain bearings, etc.

The mortise and tenon joint 28 could also be eliminated. The intermediate part 18 would then have a flexible portion permitting a radial translation of holder 20, whilst ensuring a rotation of the latter.

What is claimed is:

1. A device for the internal machining of a tube, wherein the device comprises a mobile assembly which can be positioned in the tube and has a first part with at least two bearings to provide a centering support of the mobile assembly in the tube and provided with two rotors which freely rotate along a longitudinal axis of said mobile assembly, and a second part having a machining tool mounted so as to rotate freely along a longitudinal axis so that it can machine the interior of the tube, means for linking the second part to the first part in radial sliding relationship to enable said second part to translate radially along a radial axis of said tube relative to said first part, one of the said rotors driving the machining tool via a transmission shaft and the other of the said rotors rotating the second part and a fixed assembly arranged around the tube and comprising first and second magnetic devices, each magnetic device being centered respectively substantially about the median transverse plane of each rotor and each magnetic device establishing a rotary magnetic field which rotates a respective one of said two rotors on the longitudinal axis of the mobile assembly and a third magnetic device centered substantially about the median transverse plane of the cutting tool and establishing a rotary magnetic field able to displace the second part radially with respect to the first part, whilst rotating in phase with the second part.

2. A device according to claim 1, wherein at least one of the three magnetic devices has permanent magnets rotatable about the tube.

3. A device according to claim 1, wherein at least one of the three magnetic devices has a multipole electromagnetic stator arranged around the tube.

4. A device according to claim 1, wherein two magnets are located in the vicinity of the free end of the second part of holder and wherein two magnetic detectors are positioned around the tube in such a way that one of the detectors marks the longitudinal position of the mobile assembly in the tube by detecting one of the magnets and the other detector marks the angular position of the second part by detecting the other magnet.

5. A device according to claim 1, wherein two cylindrical abutments are located on either side of the cutting tool and have a diameter equal to or less than that of said tool.

6. Apparatus for machining the interior of a tube (4) comprising:
 a pair of rotors (12, 16) for disposition with said tube;
 means (10, 14) for supporting said rotors (12, 16) within said tube (4) for independent rotation about a longitudinal axis;
 a tool holder (20) for disposition within said tube (4);
 a machining tool (30) rotatably mounted on said tool holder (20);
 means (18, 28, 32, 34) for connecting said tool holder (20) to be rotatably driven by one rotor (16), for connecting said machining tool (30) to be driven by the other rotor (12), and for enabling said tool holder (20) to be displaced radially relative to said longitudinal axis;
 and magnetic means (42, 44, 46) for disposition on the exterior of said tube (4) and operable to effect independent rotation of said rotors (12, 16) and to effect radial displacement of said tool holder (20) and said machining tool (30) thereon relative to said longitudinal axis.

7. Apparatus according to claim 6 wherein said tool holder (20) is magnetically attractable and wherein said magnetic means comprises three magnetic devices rotatable around the exterior of said tube (4), one magnetic device (42) cooperable with said rotor (12), a second magnetic device (44) cooperable with said rotor (16), and a third magnetic device (46) cooperable with said magnetically attractable tool holder (20).

8. Apparatus according to claim 7 wherein at least one of said three magnetic devices comprises a multiple electromagnetic stator for disposition around said tube (4).

9. Apparatus according to claim 6 including means for determining the longitudinal position and angular position of said machining tool (30) in said tube (4).

10. Apparatus according to claim 9 wherein said means comprises permanent magnet means mounted on said tool holder (20) cooperable with magnetic detector devices located exteriorly of said tube (4).

11. Apparatus according to claim 6 including abutment means (48, 50) mounted on said tool holder (20) for engagement with the inside of said tube (4) to limit the cutting depth of said machining tool (30).

* * * * *